(12) United States Patent
Alexandrovichserov et al.

(10) Patent No.: US 8,323,847 B2
(45) Date of Patent: Dec. 4, 2012

(54) CATALYST FOR A FUEL CELL, METHOD OF PREPARING THE SAME, AND MEMBRANE-ELECTRODE ASSEMBLY AND FUEL CELL SYSTEM INCLUDING THE SAME

(75) Inventors: Alexey Alexandrovichserov, Suwon-si (KR); Chan Kwak, Suwon-si (KR); Si-Hyun Lee, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 532 days.

(21) Appl. No.: 11/819,491

(22) Filed: Jun. 27, 2007

(65) Prior Publication Data

US 2008/0008920 A1 Jan. 10, 2008

(30) Foreign Application Priority Data

Jun. 29, 2006 (KR) ......................... 10-2006-0059454

(51) Int. Cl.
*H01M 4/86* (2006.01)
(52) U.S. Cl. ..................... 429/483; 502/325; 502/326
(58) Field of Classification Search ............... 502/182, 502/101; 562/17; 429/40, 44, 42, 30, 21, 429/483, 492, 532, 535; 520/325, 326, 327
See application file for complete search history.

(56) References Cited

U.S. PATENT DOCUMENTS

| | | |
|---|---|---|
| 5,079,107 A | 1/1992 | Jalan |
| 5,208,399 A * | 5/1993 | Miyake et al. ............... 570/224 |
| 5,872,074 A | 2/1999 | Schulz |
| 7,855,021 B2 * | 12/2010 | Adzic et al. .................... 429/424 |
| 2004/0086772 A1 * | 5/2004 | Chianelli et al. ............... 429/40 |
| 2004/0175327 A1 * | 9/2004 | Hagemeyer et al. .......... 423/656 |
| 2006/0068988 A1 * | 3/2006 | Coleman et al. .............. 502/182 |
| 2007/0281200 A1 * | 12/2007 | Tanaka et al. .................. 429/34 |
| 2011/0229795 A1 * | 9/2011 | Niu et al. ....................... 429/483 |

FOREIGN PATENT DOCUMENTS

| | | |
|---|---|---|
| JP | 2005-322430 | 11/2005 |
| JP | 2006-134648 | 5/2006 |

(Continued)

OTHER PUBLICATIONS

Article from Alonso-Vanten, et al. entitled The Structure Analysis of the Active Center of RU-Contianing Electrocatalysts for the Oxygen Reduction. An in Situe Exafs Study, Electrochemcial Acta, 47, 2002, pp. 3807-3814.*

(Continued)

*Primary Examiner* — Jennifer Michener
*Assistant Examiner* — Monique Wills
(74) *Attorney, Agent, or Firm* — Robert E. Bushnell, Esq.

(57) ABSTRACT

The cathode catalyst for a fuel cell of the present invention includes M-Co-Ch where M is at least one metal selected from the group consisting of Ru, Rh, Pd, Os, Ir, Pt, and combinations thereof, and Ch is at least one element selected from the group consisting of S, Se, Te, and combinations thereof. The cathode catalyst of the present invention has high activity and excellent selectivity for reduction of an oxidant, and is capable of improving performance of a membrane-electrode assembly for a fuel cell, a fuel cell system including the same, and a membrane-electrode assembly including the same.

21 Claims, 2 Drawing Sheets

FOREIGN PATENT DOCUMENTS

| | | | |
|---|---|---|---|
| JP | 2006-059697 | * | 3/2008 |
| KR | 10-2004-0007854 | | 1/2004 |
| WO | WO 2004/023581 | | 3/2004 |
| WO | WO 2006/041212 | | 4/2006 |

OTHER PUBLICATIONS

*Search Report* from the European Patent Office issued in Applicant's corresponding European Patent Application No. 07111215.5 dated Oct. 16, 2007.

Article from Yamanaka, et al., entitled *Physical Properties of $Mo_{6-x}Ru_xTe_8$ and $Mo_6Te_{8-x}S_x$*, Journal of Alloys and Compounds, 350, 2003, pp. 288-291.

Article from Suarez-Alcantara, et al., entitled *$Ru_xCr_ySe_z$ Electrocatalyst for Oxygen Reduction in a Polymer Electrolyte Membrane Fuel Cell*, Journal of Power Sources, 157, 2006, pp. 114-120.

Article from Alonso-Vanten, et al., entitled *The Structure Analysis of the Active Center of Ru-Containing Electrocatalysts Forme Oxygen Reduction. An in Situ EXAFS Study*, Electrochimica Acta, 47, 2002, pp. 3807-3814.

Article from Malakhoviv, et al., entitled, *In Situ EXAFS Study of Ru-Containing Electrocatalysts of Oxygen Reduction*, Nuclear instruments and Methods in Physics Research, A, 448, 2000, pp. 323-326.

* cited by examiner

CATALYST FOR A FUEL CELL, METHOD OF PREPARING THE SAME, AND MEMBRANE-ELECTRODE ASSEMBLY AND FUEL CELL SYSTEM INCLUDING THE SAME

CROSS-REFERENCE TO RELATED APPLICATION AND CLAIM OF PRIORITY

This application claims priority to and the benefit of Korean Patent Application No. 10-2006-0059454 filed in the Korean Intellectual Property Office on Jun. 29, 2006, the entire content of which is incorporated herein by reference.

BACKGROUND OF THE INVENTION (a) Field of the Invention

The present invention relates to a catalyst for a fuel cell, a method of preparing the same, a membrane-electrode assembly for a fuel cell including the same, and a fuel cell system including the same. More particularly, the present invention relates to a cathode catalyst having an improved catalytic activity and selectivity for reduction of an oxidant, and a membrane-electrode assembly including the same.

(b) Description of the Related Art

A fuel cell is a power generation system for producing electrical energy through an electrochemical redox reaction of an oxidant and hydrogen in a hydrocarbon-based material such as methanol, ethanol, or natural gas.

Representative exemplary fuel cells include a polymer electrolyte membrane fuel cell (PEMFC) and a direct oxidation fuel cell (DOFC). The direct oxidation fuel cell includes a direct methanol fuel cell that uses methanol as a fuel.

The polymer electrolyte membrane fuel cell has an advantage of a high energy density and energy conversion efficiency, but it also has problems in the need to carefully handle hydrogen gas and the requirement of additional devices such as a fuel reforming processor for reforming methane or methanol, natural gas, and the like in order to produce hydrogen as the fuel gas.

On the contrary, a direct oxidation fuel cell has a lower energy density than that of the polymer electrolyte membrane fuel cell, but it has the advantages of easy handling of a fuel, being capable of operating at room temperature, and no need for additional fuel reforming processors. Therefore, it has been acknowledged as an appropriate system for a portable power source for small electrical devices.

In the above fuel cells, the stack that generates electricity substantially includes several to scores of unit cells stacked in multiple layers, and each unit cell is formed of a membrane-electrode assembly (MEA) and a separator (also referred to as a bipolar plate). The membrane-electrode assembly has an anode (also referred to as a "fuel electrode" or an "oxidation electrode") and a cathode (also referred to as an "air electrode" or a "reduction electrode") that are separated by a polymer electrolyte membrane.

The above information disclosed in this Background section is only for enhancement of understanding of the background of the invention and therefore it may contain information that does not form the prior art that is already known in this country to a person of ordinary skill in the art.

SUMMARY OF THE INVENTION

One embodiment of the present invention provides a catalyst.

Another embodiment of the present invention provides a membrane-electrode assembly for a fuel cell that includes the catalyst for a cathode.

Yet another embodiment of the present invention provides a fuel cell system that includes the membrane-electrode assembly.

According to one embodiment of the present invention, a catalyst includes M-Co-Ch where M is at least one metal selected from the group consisting of Ru, Rh, Pd, Os, Ir, Pt, and combinations thereof, and Ch is at least one element selected from the group consisting of S, Se, Te, and combinations thereof.

In the M-Co-Ch, M is Ru, and Ch is Te.

Herein, M is included in an amount of 15 to 40 at %, Co is included in an amount of 20 to 50 at %, and Ch is included in an amount of 10 to 65 at %.

The M-Co-Ch has a nanowire shape.

According to another embodiment of the present invention, provided is a membrane-electrode assembly for a fuel cell that includes an anode and a cathode facing each other and a polymer electrolyte membrane interposed therebetween. The anode and the cathode each include a conductive electrode substrate and a catalyst layer disposed on the electrode substrate. The catalyst layer of the cathode includes the cathode catalyst.

According to an embodiment of the present invention, provided is a fuel cell system that includes at least one electricity generating element, a fuel supplier, and an oxidant supplier. The electricity generating element includes a membrane-electrode assembly and separators arranged at each side thereof. The membrane-electrode assembly includes a cathode, an anode, and a polymer electrolyte membrane interposed therebetween. The cathode includes the above cathode catalyst.

According to yet another embodiment of the present invention, the catalyst is prepared by mixing a source of the metal M, a source of Co, a Ch-supplying material with a solvent to prepare a mixture; drying the mixture; and heat-treating the dried mixture. The mixing may include: anodizing an aluminum thin membrane to form an aluminum oxide thin membrane having pores; mixing the source of the M, the source of the cobalt and $H_3BO_4$; forming an alloy comprised of the M and the cobalt around the pores of the aluminum oxide thin membrane by electrodeposition; removing the aluminum oxide to form a nanowire shape of the alloy; and mixing the nanowire-shape of the alloy with the Ch-supplying material.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
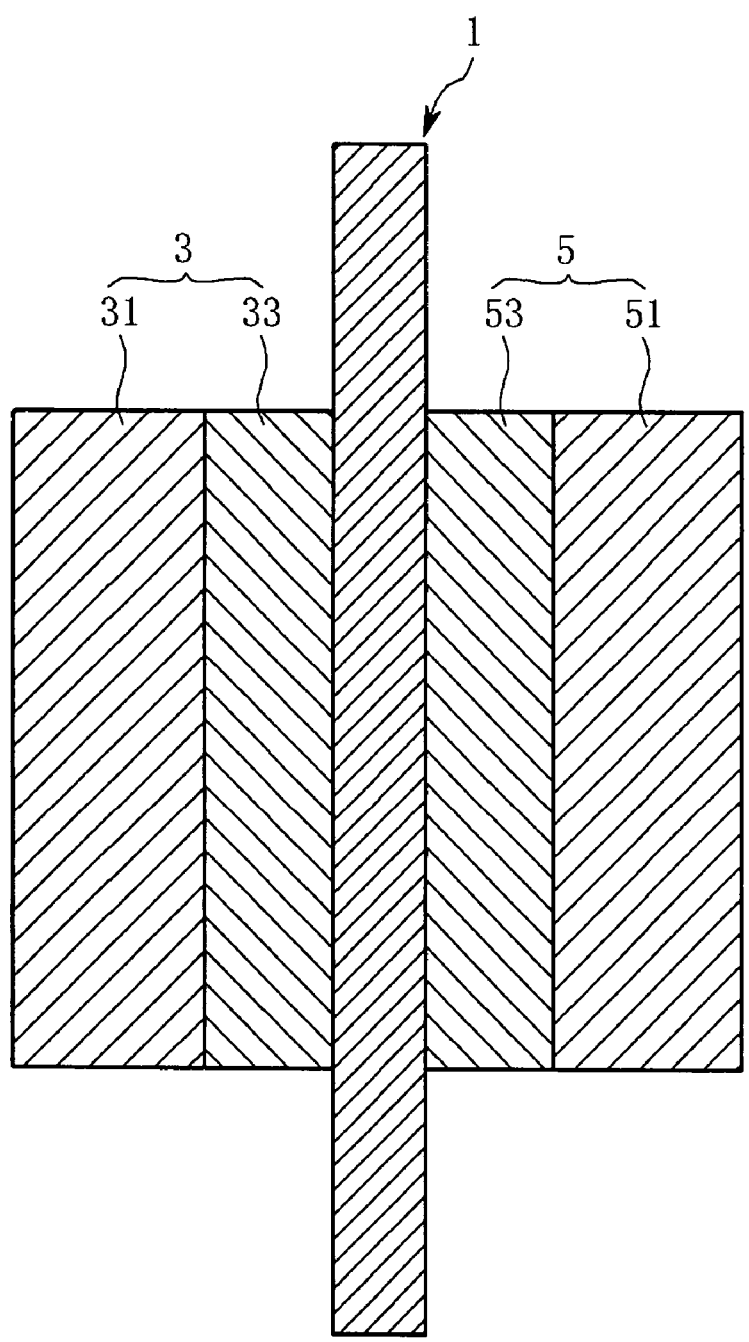
FIG. 1 is a schematic cross-sectional view showing a membrane-electrode assembly according to one embodiment of the present invention.

Embodiments of the present invention will hereinafter be described in detail with reference to the accompanying drawings.

A fuel cell is a power generation system for generating electrical energy through oxidation of fuel and reduction of an oxidant. The oxidation of the fuel occurs at an anode, while the reduction of the oxidant occurs at a cathode.

The anode includes a catalyst layer that includes a catalyst (which is also referred to as "anode catalyst") to catalyze the oxidation of the fuel. The cathode includes a catalyst layer that includes a catalyst (which is also referred to as "cathode catalyst") to catalyze the reduction of an oxidant. An example of the catalyst for the anode catalyst layer representatively includes platinum-ruthenium, and an example of the cathode catalyst for the cathode catalyst layer may include platinum.

However, platinum as the cathode catalyst has a problem of low selectivity for reduction of an oxidant. It can also be depolarized by a fuel crossed-over toward a cathode through an electrolyte membrane so that the cathode catalyst may be inactivated in a direct oxidation fuel cell. Therefore, attention has been paid to another catalyst that can substitute for platinum.

The cathode catalyst for a fuel cell according to one embodiment of the present invention includes M-Co-Ch where M is at least one metal selected from the group consisting of Ru, Rh, Pd, Os, Ir, Pt, and combinations thereof, and Ch is at least one element selected from the group consisting of S, Se, Te, and combinations thereof.

In the M-Co-Ch, M is at least one platinum group metal element selected from the group consisting of Ru, Rh, Pd, Os, Ir, Pt, and combinations thereof and has high activity and selectivity for reduction of an oxidant. However, the platinum group metal easily absorbs oxygen in the air. Accordingly, the absorbed oxygen blocks an active center where an oxidant is reduced, and thereby interferes with the reduction.

In the above, Ch is at least one chalcogen element selected from the group consisting of sulfur (S), selenium (Se), tellurium (Te), and combinations thereof. It is combined with the metal M, and thereby prevents oxygen in the air from being absorbed to the metal M. This helps the metal M to be active for reduction of an oxidant. In addition, M-Ch has excellent electrical conductivity and catalyst activity. In particular, M-Te has better electrical conductivity and catalyst activity than M-S and M-Se.

The cobalt (Co) may increase the catalyst activity of the metal M. The cobalt includes sufficient electrons to supply to the metal M and functions as an electron donor for the metal M, and thereby, can increase catalyst activity of the metal M.

M-Co-Ch has excellent activity and selectivity for reduction of an oxidant, working effectively as a cathode catalyst for a fuel cell. In particular, due to its excellent selectivity for reduction of an oxidant, it can be more usefully used for a direct oxidation fuel cell that has a problem of fuel cross-over.

According to an embodiment of the present invention, the M-Co-Ch includes M in an amount of 15 to 40 atomic percent (at %), Co in an amount of 20 to 50 at %, and Ch in an amount of 10 to 65 at % based on the total number of atoms of the M-Co-Ch. When M is included in an amount of less then 15 at %, the catalyst may have low activity, while when M is included in an amount of more than 40 at %, the catalyst may have low selectivity. When Co is included in an amount of less than 20 at %, the catalyst may have low activity, while when Co is included in an amount of more than 50 at %, the catalyst may have too large particles.

When Ch is included in an amount of less than 10 at %, the catalyst may have low selectivity, while when Ch is included in an amount of more than 65 at %, the catalyst may have low activity.

The M-Co-Ch can be used as a black type not supported on a carrier or as one supported on a carrier. When it is supported on a carrier, its specific surface area can be expanded, further increasing activity. In addition, the M-Co-Ch can be prepared to have a nanowire shape, so that it can have a small particle size and an expanded specific surface area, and thereby, much improved activity.

When the M-Co-Ch is supported on a carrier, the carrier may include a carbon-based material. The carbon-based material may be selected from the group consisting of graphite, denka black, ketjen black, acetylene black, carbon nanotube, carbon nanofiber, carbon nanowire, carbon nanoball, activated carbon, and combinations thereof.

The M-Co-Ch supported on a carbon-based material can be prepared by mixing a water-soluble salt of the metal M, a water-soluble salt of Co, a Ch-supplying material, and a carbon-based material with a solvent, drying the mixture, and then heat-treating it. The solvent includes water, methanol, or ethanol, but is not limited thereto.

Examples of the water-soluble salt of the metal M may include M chloride, M acetyl acetonate, and M nitrosylnitrate. Examples of the water-soluble salt of Co may include cobalt acetate, cobalt nitrate, cobalt chloride, cobalt acetyl acetonate, and cobalt carbonyl. Examples of the material supplying a chalcogen element may include sulfur powder, selenium powder, tellurium powder, $H_2SO_3$, $H_2SeO_3$, or $H_2TeO_3$.

The drying process may be performed under vacuum conditions at a temperature ranging from 200 to 300° C. The heat treatment may be performed under a hydrogen atmosphere at a temperature ranging from 300 to 400° C.

The nanowire-type M-Co-Ch can be prepared by the following manufacturing method.

First, an aluminum thin membrane is anodized to form a micropore therein. The anodizing treatment includes putting an anode and a cathode in an electrolyte solution, and then oxidizing the anode made of a metal into a metal oxide by letting a current flow through the anode and the cathode. For instance, when the anode is made of aluminum, the anode is turned into an aluminum oxide. The aluminum oxide produced through the anodizing treatment has pores, and the pores have an average diameter of about 50 nm.

Next, the aluminum oxide thin membrane is mixed with a precursor of an M metal, for example, ruthenium, a precursor of cobalt, and then $H_3BO_4$ is added thereto, preparing a mixture solution. Then, when the mixture solution is treated in an electrodeposition method, the M metal and Co are reduced to form a ruthenium and cobalt alloy around pores of the aluminum oxide thin membrane.

The electrodeposition method is illustrated in more detail as follows.

First, a material for electrodeposition is dipped in a container containing a solution including at least one metal salt. The material for electrodeposition is used as a cathode of an electric circuit. An anode is made of the same material as a plating metal. When a current starts to flow through a circuit, metal ions in a solution stick to the material for electrodeposition. As a result, a metal layer is formed on the surface of the material for electrodeposition. This process is the same as the one where a galvanic cell is reversibly operated.

The anode and the cathode in an electrodeposition container are connected with an external battery supplying a current, or in general, are connected with a rectifier. The anode is connected with the positive electrode of the battery, while the cathode is connected with the negative electrode of the battery. When a switch is in the on state, a metal is oxidized at the anode, producing metal cations. The metal cations are combined with anions in a solution and turned into a metal salt. In addition, the metal cations are reduced at the cathode into a metal, and deposited on the surface of the material for elecrodepositon. Herein, when Cu is used as the anode, the Cu is oxidized into $Cu^{2+}$. The $Cu^{2+}$ is then combined with $SO_4^{2-}$ anion in the solution, forming a copper sulfate. The $Cu^{2+}$ also gains two electrons at the cathode and is reduced into a Cu metal.

After the electrodeposition, an aluminum oxide thin membrane having a ruthenium-cobalt alloy is put in a KOH aqueous solution or a NaOH aqueous solution to remove the aluminum oxide. When the aluminum oxide is removed, the ruthenium-cobalt alloy can have a nanowire shape.

Lastly, the nanowire-shaped ruthenium-cobalt alloy is mixed with S, Se, or Te sources in a solvent, and the resulting product is dried and heat-treated, gaining a cathode catalyst of the present invention. Examples of the S, Se, and Te sources may include $H_2SO_3$, $H_2SeO_3$, or $H_2TeO_3$, and the solvent may include water, methanol, or ethanol.

In addition, the present invention provides a membrane-electrode assembly for a fuel cell including the cathode catalyst for a fuel cell.

According to the embodiment of the present invention, a membrane-electrode assembly includes an anode and a cathode facing each other and an electrolyte membrane (e.g., polymer electrolyte membrane) positioned between the anode and the cathode. The anode and the cathode each include an electrode substrate made of a conductive material and a catalyst layer formed on the electrode substrate.

FIG. 1 is a schematic cross-sectional view showing a membrane-electrode assembly 131 according to one embodiment of the present invention. The membrane-electrode assembly 131 will be described in detail with the reference to FIG. 1.

The membrane-electrode assembly 131 generates electricity through fuel oxidation and oxidant reduction, and one or more membrane-electrode assemblies constitute a stack.

At a cathode catalyst layer 53, which includes a cathode catalyst, an oxidant reduction reaction occurs. The cathode catalyst has high activity and selectivity for a reduction reaction of an oxidant, and thus can effectively improve performance of the cathode 5 and the membrane-electrode assembly 131.

At an anode catalyst layer 33, a fuel oxidation reaction occurs, and it may include a general platinum-based catalyst for facilitating the reaction. Examples of the platinum-based catalyst may include platinum, ruthenium, osmium, platinum-ruthenium alloys, platinum-osmium alloys, platinum-palladium alloys, platinum-N alloys (where N is a transition element selected from the group consisting of Ga, Ti, V, Cr, Mn, Fe, Co, Ni, Cu, Zn, Sn, Mo, W, Rh, Ru and combinations thereof), and combinations thereof. In a direct oxidation fuel cell, since an anode catalyst may be poisoned by CO, CO-tolerant platinum-ruthenium alloy catalysts may be suitably used as an anode catalyst. More specifically, non-limiting examples of the platinum-based catalyst are selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, Pt/Ru/Sn/W, and combinations thereof.

Such a metal catalyst may be used in the form of a metal itself (black type catalyst in which the catalyst is not supported on a carrier), or one supported on a carrier. The carrier may include carbon such as graphite, denka black, ketjen black, acetylene black, carbon nanotubes, carbon nanofiber, carbon nanowire, carbon nanoballs, or activated carbon, or an inorganic particulate such as alumina, silica, zirconia, or titania. Carbon is generally used.

The catalyst layers 33 and 53 of the anode 3 and the cathode 5 may include a binder resin to improve adherence and proton transfer properties.

Examples of the binder resin may include a proton conductive polymer resins having a cation exchange group selected from the group consisting of a sulfonic acid group, a carboxylic acid group, a phosphoric acid group, a phosphonic acid group, and derivatives thereof at its side chain. Non-limiting examples of the polymer resin include at least one proton conductive polymer selected from the group consisting of perfluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly(2, 5-benzimidazole).

The binder resins may be used singularly or in combination. They may be used along with non-conductive polymers to improve adherence with a polymer electrolyte membrane. The binder resins may be used in a controlled amount to adapt to their purposes.

Non-limiting examples of the non-conductive polymer include polytetrafluoroethylene (PTFE), tetrafluoroethylene-hexafluoropropylene copolymers (FEP), tetrafluoroethylene-perfluoro alkyl vinylether copolymers (PFA), ethylene/tetrafluoroethylene (ETFE), chlorotrifluoroethylene-ethylene copolymers (ECTFE), polyvinylidenefluoride, polyvinylidenefluoride-hexafluoropropylene copolymers (PVdF-HFP), dodecylbenzenesulfonic acid, sorbitol, and combinations thereof.

The electrode substrates 31 and 51 of the anode 3 and the cathode 5 support the anode 3 and the cathode 5, respectively, and provide a path for transferring the fuel and the oxidant to the catalyst layers 33 and 53. As for the electrode substrates 31 and 51, a conductive substrate is used, for example a carbon paper, a carbon cloth, a carbon felt, or a metal cloth, or a porous film including a metal cloth fiber or a metallized polymer fiber, but is not limited thereto.

The electrode substrates 31 and 51 may be treated with a fluorine-based resin to be water-repellent to prevent deterioration of diffusion efficiency due to water generated during operation of a fuel cell. The fluorine-based resin may include polytetrafluoroethylene, polyvinylidene fluoride, polyhexafluoro propylene, polyperfluoroalkylvinylether, polyperfluoro sulfonylfluoride alkoxyvinyl ether, fluorinated ethylene propylene, polychlorotrifluoro ethylene, or copolymers thereof, but is not limited thereto.

A microporous layer (MPL, not shown) can be added between the aforementioned electrode substrates 31 and 51 and the catalyst layers 33 and 53 to increase reactant diffusion effects. The microporous layer generally includes conductive powders with a particular particle diameter. The conductive material may include, but is not limited to, carbon powder, carbon black, acetylene black, activated carbon, carbon fiber, fullerene, nano-carbon, or combinations thereof. The nano-carbon may include a material such as carbon nanotubes, carbon nanofiber, carbon nanowire, carbon nanohorns, carbon nanorings, or combinations thereof.

The microporous layer is formed by coating a composition including a conductive powder, a binder resin, and a solvent on the conductive substrate. The binder resin may include, but is not limited to, polytetrafluoro ethylene, polyvinylidene fluoride, polyhexafluoro propylene, polyperfluoroalkylvinyl ether, polyperfluoro sulfonylfluoride alkoxy vinyl ether, polyvinyl alcohol, cellulose acetate, or copolymers thereof. The solvent may include, but is not limited to, an alcohol such as ethanol, isopropyl alcohol, n-propyl alcohol, butanol, and so on, water, dimethyl acetamide, dimethyl sulfoxide, N-methylpyrrolidone, and tetrahydrofuran. The coating method may include, but is not limited to, screen printing, spray coating, doctor blade methods, gravure coating, dip coating, silk screening, painting, and so on, depending on the viscosity of the composition.

The polymer electrolyte membrane 1 plays a role of exchanging ions by transferring protons produced at the anode catalyst layer 33 to the cathode catalyst layer 53, and includes a polymer having excellent proton conductivity.

The proton conductive polymer for the polymer electrolyte membrane 1 of the embodiment of the present invention may be any polymer resin having a cation exchange group selected from the group consisting of a sulfonic acid group, a carboxylic acid group, a phosphoric acid group, a phosphonic acid group, and derivatives thereof, at its side chain.

Non-limiting examples of the polymer resin for the polymer electrolyte membrane of the embodiment of the present invention include at least one proton conductive polymer selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly(2,5-benzimidazole).

H can be replaced with Na, K, Li, Cs, or tetrabutylammonium in a proton conductive group of the proton conductive polymer. When H is substituted by Na in an ion exchange group at the terminal end of the proton conductive group, NaOH is used. When H is replaced with tetrabutylammonium, tributylammonium hydroxide is used. K, Li, or Cs can also be replaced by using appropriate compounds. Since methods of substituting H are known in this related art, the methods are not further described in detail.

According to another embodiment of the present invention, a fuel cell system including the above membrane-electrode assembly is provided.

A fuel cell system of an embodiment of the present invention includes at least one electricity generating element, a fuel supplier, and an oxidant supplier.

The electricity generating element includes a membrane-electrode assembly that includes a cathode, an anode a polymer electrolyte membrane positioned between the cathode and the anode, and separators positioned at both sides of the membrane-electrode assembly. It generates electricity through oxidation of a fuel and reduction of an oxidant.

The fuel supplier plays a role of supplying the electricity generating element with a fuel including hydrogen, and the oxidant supplier plays a role of supplying the electricity generating element with an oxidant. The oxidant includes oxygen or air.

The fuel includes liquid or gaseous hydrogen, or a hydrocarbon-based fuel such as methanol, ethanol, propanol, butanol, or natural gas.

The fuel cell system may be applied to a polymer electrolyte membrane fuel cell (PEMFC), a direct oxidation fuel cell (DOFC), or a mixed reactant fuel cell.

Figure 2:
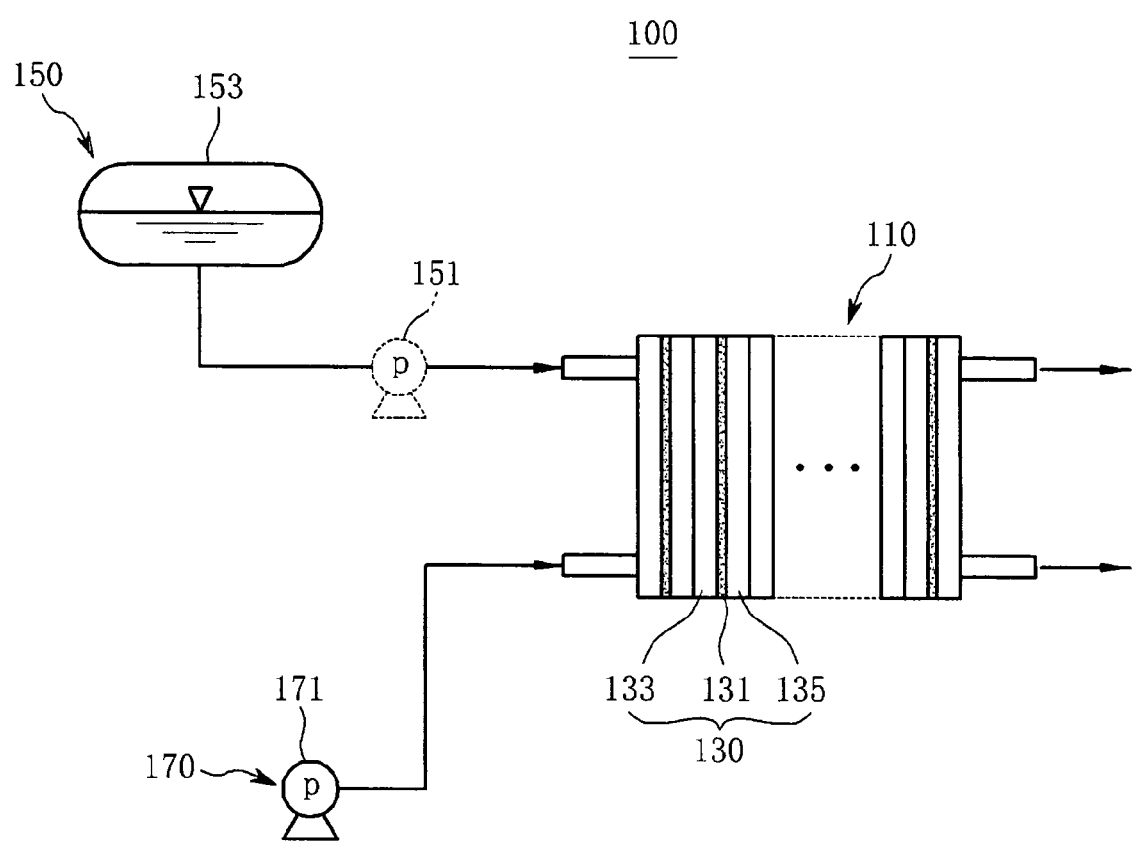
FIG. 2 schematically shows the structure of a fuel cell system according to one embodiment of the present invention.

FIG. 2 shows a schematic structure of a fuel cell system 100 that will be described in detail with reference to this accompanying drawing as follows. FIG. 2 illustrates a fuel cell system 100 wherein a fuel and an oxidant are provided to the electricity generating element 130 through pumps 151 and 171, but the present invention is not limited to such structures. The fuel cell system of the present invention may alternately include a structure wherein a fuel and an oxidant are provided in a diffusion manner.

The fuel cell system 100 includes a stack 110 composed of at least one electricity generating element 130 that generates electrical energy through an electrochemical reaction of fuel and an oxidant, a fuel supplier 150 for supplying the fuel to the electricity generating element 130, and an oxidant supplier 170 for supplying the oxidant to the electricity generating element 130.

In addition, the fuel supplier 150 is equipped with a tank 153, which stores the fuel, and a fuel pump 151, which is connected therewith. The fuel pump 151 supplies fuel stored in the tank 153 with a predetermined pumping power.

The oxidant supplier 170, which supplies the electricity generating element 130 of the stack 110 with the oxidant, is equipped with at least one pump 171 for supplying the oxidant with a predetermined pumping power.

The electricity generating element 130 includes a membrane-electrode assembly 131, which oxidizes fuel such as hydrogen and reduces the oxidant, and separators 133 and 135 that are respectively positioned at each side of the membrane-electrode assembly and supply fuel such as hydrogen, and an oxidant, respectively. At least one electricity generating element 130 constitutes a stack 110.

The following examples illustrate the present invention in more detail. However, it is understood that the present invention is not limited by these examples.

Example 1

An aluminum oxide thin membrane with micropores was prepared by anodizing an aluminum thin membrane with purity degree of 99.999% in two steps. The micropores had an average diameter of 50 nm. The first anodizing treatment was performed by applying a stable voltage of 40V into 0.3M of an oxalic acid aqueous solution at 10 to 15° C. for 3 hours.

The first anodized aluminum thin membrane was mixed with 0.4 M of $H_3PO_4$ and 0.2 M of $H_2Cr_2O_4$ at a temperature ranging from 50 to 80° C., preparing a solution. The mixed solution was secondly anodized. The second anodizing treatment was the same as the first one except that it was performed for 10 hours.

The prepared aluminum oxide thin membrane was dipped in a 5% phosphoric acid solution at a temperature ranging from 50 to 80° C. for 20 minutes to remove unnecessary materials, forming micropores in the aluminum oxide thin membrane.

The aluminum oxide thin membrane with micropores was mixed with 1.2 mol/l of $CoSO_4$, 0.012 mol/l of $K_2RuCl$, and 30 to 40 g/l of $H_3BO_4$, preparing a mixture solution with pH of 2.0. The mixture solution was electrodeposited at 8.0V.

The electrodeposition was performed at room temperature. It also was performed by using three-electrodes, potentiostatic control, and direct current (DC). Herein, a saturated calomel electrode (SCE) was used as a reference electrode. A platinum plate was used as a counter electrode, and an aluminum oxide thin membrane coated with Ag was used as a working electrode.

When the aluminum oxide thin membrane with micropores was electrodeposited, a Ru—Co nanowire was formed thereon. The aluminum oxide thin membrane with the Ru—Co nanowire was annealed at 700° C. under an Ar atmosphere for 20 minutes. The thin membrane having the ruthenium-cobalt alloy was put in a KOH aqueous solution to remove an aluminum oxide. When the aluminum oxide was completely removed, the ruthenium-cobalt alloy could have a nanowire shape.

The nanowire-shaped ruthenium-cobalt alloy and $H_2TeO_3$ were added to ethanol, and then mixed together. The resulting mixture was dried at 250° C. and heat-treated at 350° C., preparing the cathode catalyst of the embodiment of the present invention.

Reference Example 1

0.6 g of ruthenium carbonyl, 0.03 g of Se, and 1 g of carbon were mixed in 150 ml of toluene as a solvent at 100° C. for 24 hours. The mixture was filtrated, and then dried at 80° C., gaining a powder. The powder was heat-treated under a hydrogen atmosphere at 250° C. for 3 hours, gaining a cathode catalyst (Ru—Se/C) for a fuel cell.

In order to examine the catalysts of Example 1 and Reference Example 1, a sulfuric acid solution saturated with oxygen was prepared by bubbling oxygen gas into a sulfuric acid solution in a 0.5M concentration. Then, the catalysts were loaded on a glassy carbon with $3.78 \times 10^{-3}$ mg to form a working electrode, while a platinum mesh was used as a counter electrode. Both electrodes were placed in the sulfuric acid solution, and then the current densities according to the change of their voltages were measured. The catalyst of Example 1 turned out to have similar catalyst activity to the catalyst of Reference Example 1.

The embodiments of the cathode catalyst of the present invention has high activity and excellent selectivity for reduction of an oxidant, and is capable of improving performance of a membrane-electrode assembly for a fuel cell, and a fuel cell system and a membrane-electrode assembly including the same.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A catalyst for a fuel cell, consisting essentially of:
M-Co-Ch, where M is at least one metal selected from the group consisting of Ru, Rh, Pd, Os, Ir, Pt, and combinations thereof, Co is cobalt, and Ch comprises Te.

2. The catalyst of claim 1, wherein M is Ru, and Ch is Te.

3. The catalyst of claim 1, wherein the M-Co-Ch comprises 15 to 40 at % of M, 20 to 50 at % of Co, and 10 to 65 at % of Ch, based on the total number of atoms in the M-Co-Ch.

4. The catalyst of claim 1, wherein the M-Co-Ch has a nanowire shape.

5. A membrane-electrode assembly for a fuel cell, comprising:
an anode comprising a conductive electrode substrate and a catalyst layer disposed on the electrode substrate of the anode;
a cathode facing the anode comprising a conductive electrode substrate and a catalyst layer disposed on the electrode substrate of the cathode, the catalyst layer comprising a cathode catalyst consisting essentially of M-Co-Ch where M is at least one metal selected from the group consisting of Ru, Rh, Pd, Os, Ir, Pt, and combinations thereof, Co is cobalt, and Ch is at least one element selected from the group consisting of S, Se, Te, and combinations thereof; and
a polymer electrolyte membrane interposed between the anode and the cathode.

6. The membrane-electrode assembly of claim 5, wherein M is Ru, and Ch is Te.

7. The membrane-electrode assembly of claim 5, wherein the M-Co-Ch comprises 15 to 40 at % of M, 20 to 50 at % of Co, and 10 to 65 at % of Ch, based on the total number of atoms in the M-Co-Ch.

8. The membrane-electrode assembly of claim 5, wherein the M-Co-Ch has a nanowire shape.

9. A fuel cell system comprising:
at least one electricity generating element, comprising:
the membrane-electrode assembly of claim 5; and
separators positioned at each side of the membrane-electrode assembly;
a fuel supplier supplying the electricity generating element with fuel; and
an oxidant supplier supplying the electricity generating element with an oxidant.

10. The fuel cell system of claim 9, wherein the fuel cell system is selected from the group consisting of a polymer electrolyte fuel cell and a direct oxidation fuel cell.

11. The fuel cell system of claim 9, wherein the fuel cell system is a direct oxidation fuel cell.

12. A method of manufacturing a catalyst consisting essentially of M-Co-Ch, where M is at least one metal selected from the group consisting of Ru, Rh, Pd, Os, Ir, Pt, and combinations thereof, Co is cobalt, and Ch is at least one element selected from the group consisting of S, Se, Te, and combinations thereof, the method comprising:
mixing a source of the metal , a source of Co, a Ch-supplying material with a solvent to prepare a mixture;
drying the mixture; and
heat-treating the dried mixture.

13. The method of claim 12, wherein the source of the metal M is selected from the group consisting of M chloride, M acetyl acetonate, and M nitrosylnitrate.

14. The method of claim 12, wherein the source of the cobalt is selected from the group consisting of cobalt acetate, cobalt nitrate, cobalt chloride, cobalt acetyl acetonate, and cobalt carbonyl.

15. The method of claim 12, wherein the Ch-supplying material is selected from the group consisting of sulfur powder, selenium powder, tellurium powder, $H_2SO_3$, $H_2SeO_3$, and $H_2TeO_3$.

16. The method of claim 12, wherein the drying is performed at 200 to 300° C.

17. The method of claim 12, wherein the heat-treating is performed at 300 to 400° C.

18. The method of claim 12, wherein, in the mixing, a carbon-based material is further added to form the catalyst supported on the carbon-based material.

19. The method of claim 12, wherein the mixing comprises:
anodizing an aluminum thin membrane to form an aluminum oxide thin membrane having pores;
mixing the source of the M, the source of the cobalt and $H_3BO_4$;

forming an alloy comprised of the M and the cobalt around the pores of the aluminum oxide thin membrane by electrodeposition;

removing the aluminum oxide to form a nanowire shape of the alloy; and mixing the nanowire-shape of the alloy with the Ch-supplying material.

20. The method of claim 19, wherein the M is ruthenium.

21. The catalyst of claim 1, wherein the catalyst is Os—Co—Te.

* * * * *